Patented Feb. 7, 1939

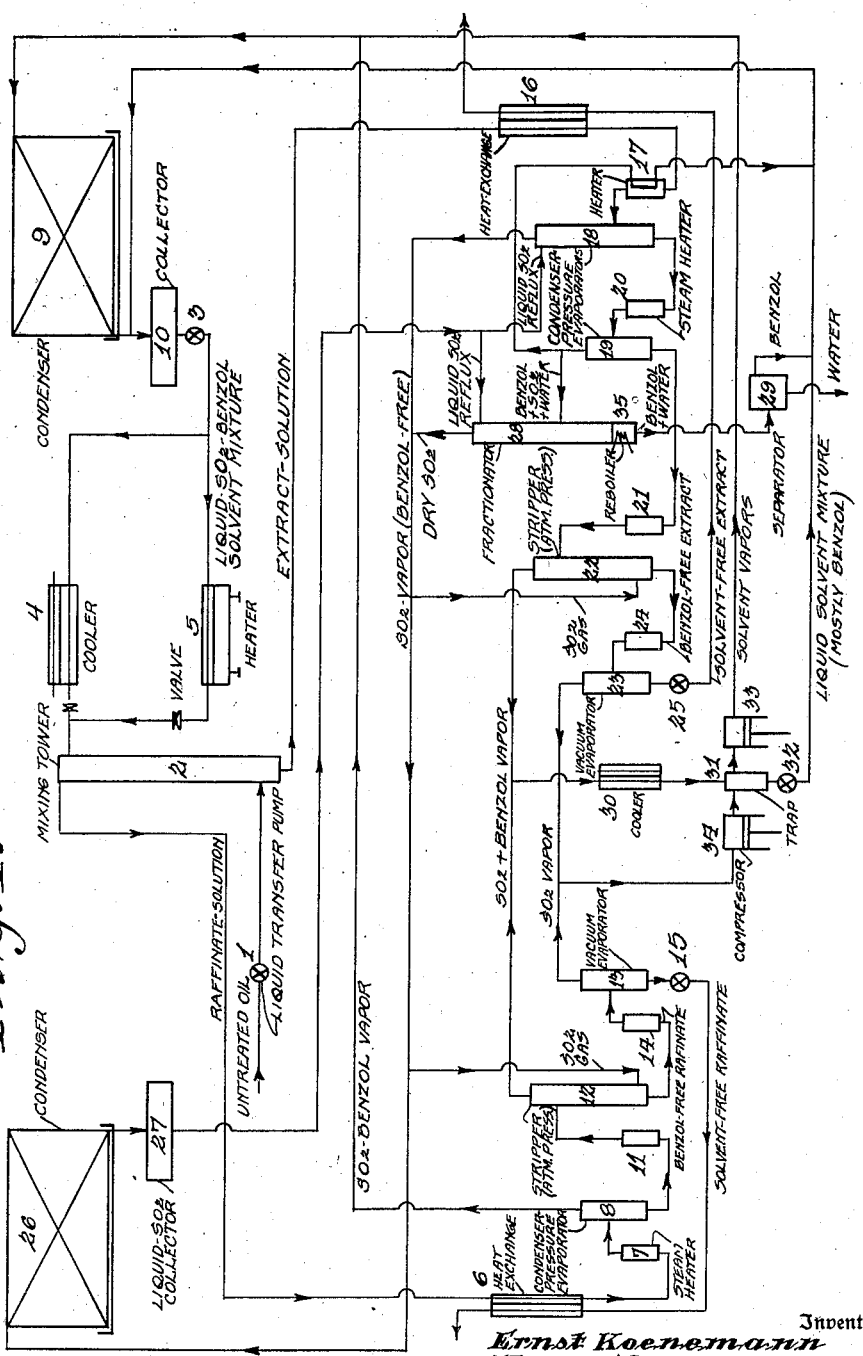

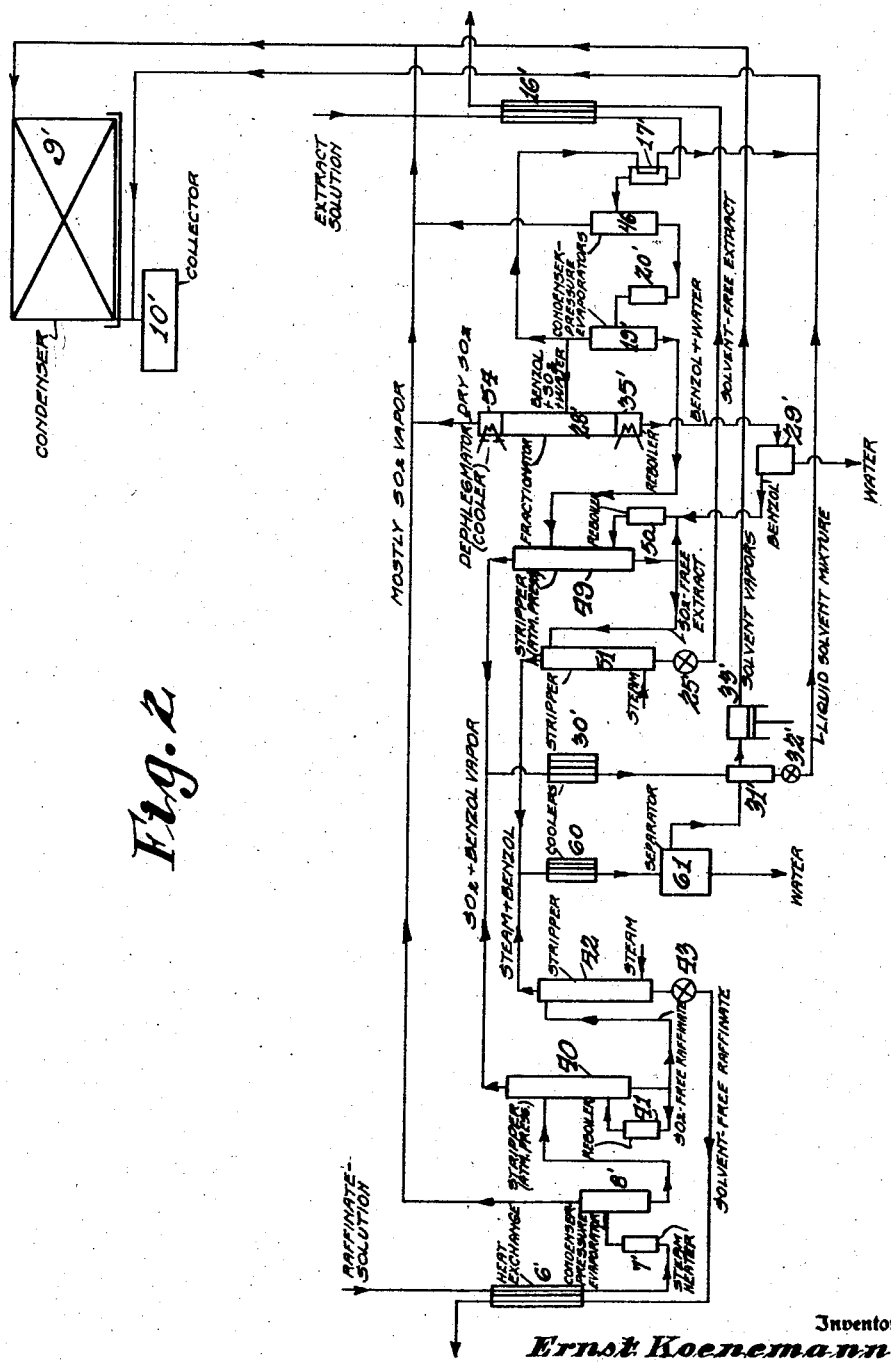

2,146,679

UNITED STATES PATENT OFFICE 2,146,679

RECOVERY OF MIXED SOLVENTS FROM MINERAL OILS

Ernst Koenemann and Hans Ramser, Berlin, Germany, assignors to Edeleanu Gesellschaft, m. b. H., a German corporation Application August 16, 1934, Serial No. 740,191 In Germany August 26, 1933

26 Claims. (Cl. 202—46)

Our invention relates to a method of recovering mixed-solvents from solutions thereof with hydrocarbon oils, such as mineral oils. A particular object of the invention is to provide for efficient recovery of the mixed-solvent contained in the raffinate and extract solutions resulting from the mixed-solvent treatment of mineral lubricating oil fractions, with special reference to the recovery of the components in solvent mixtures of liquid-$SO_2$ and benzol or the like, although the invention is not limited thereto.

The scope and flexibility of the process of refining hydrocarbon oils with liquid-$SO_2$ ("Edeleanu process") has been increased by the use of an auxiliary solvent, or solvent aid, mixed with the liquid-$SO_2$ in order to increase its refining action. This has made possible a great improvement in the refining of petroleum lubricating oil fractions, for example. Among the solvent aids employed and suggested for this purpose are benzol and its homologues, chloroform, ether, carbon disulfide, and mixtures of these substances.

In recovering such solvent mixtures from the raffinate and extract solutions resulting from the extraction of the raw oil with the mixed-solvent, it is very important to completely free the raffinate and extract from the costly solvent and to recover the latter for repeated use. This may be accomplished by evaporation methods employing high temperature, but as most of these solvent mixtures contain a solvent which is detrimental to the oil at high temperatures it is necessary to apply other methods of recovery. A principal object of this invention is to provide such a method and one which is of general application for the efficient recovery of solvent mixtures.

According to our invention one of the solvents of the mixture is utilized for stripping out the other, or others, from the oil-solvent solutions. It is not essential which of the solvent components is used for stripping. For example in the case of solvent mixtures comprised of liquid-$SO_2$ and one or more solvent aids, the sulfur dioxide may be used for stripping out the solvent aid, or the solvent aid (or one of the solvent aids in case several are employed) may be used as the stripping agent. Since a portion of the solvent used as the stripping agent will remain in the oil after the stripping step, while the other solvent or solvents will be completely removed by the stripping, it is generally preferable to use that solvent component as the stripping agent which can be most easily or advantageously removed from the oil following the solvent stripping.

The stripping pressure is determined by the method used for condensing the expelled or stripped out solvent mixture. If, for instance, it is desired to recover the solvent mixture as such, without separating the different solvent components, a pressure should preferably be employed which will be high enough to permit all of the components, including that of the highest vapor pressure, to be condensed in a water-cooled condenser. On the other hand, if it is desired to separately recover the different components of the solvent mixture, it is preferable to strip at a lower pressure in order to facilitate fractionating the solvents taken overhead in the stripper.

If the lowest-boiling component of the solvent mixture is used as the stripping agent, the stripping is preferably performed by blowing this solvent substance, as a gas, through the solution of oil and solvents. In the case of liquid-$SO_2$-benzol solvent solutions, this means that $SO_2$ gas will be used. The residual solvent remaining in the oil, comprising the lowest-boiling component of the solvent mixture, may then be readily removed by the mere application of heat and/or vacuum sufficient to vaporize the solvent from the oil. Or the solvent may be vaporized from the oil by stripping with steam or other gas from which the solvent can later be recovered.

However, if the highest-boiling solvent component is used for stripping, the preferred procedure is to reboil a portion of the oil-solvent solution leaving the stripper and recycle it into the lower part of the stripper, employing a temperature sufficiently high so that all of the solvent content except a small fraction of this highest-boiling component is vaporized. The highest-boiling solvent component will thereby exert a blowing or stripping action on the oil solution entering the stripper, thus removing all of the lower-boiling solvent components.

The removal of the residual amount of the highest-boiling solvent component, which remains in the oil after the stripping just described, may be effected by subsequently stripping the oil with the aid of steam, or other gas, from which the stripped-out solvent can later be recovered. In certain cases it will be possible to free the oil of this residual solvent by the mere application of heat and/or vacuum, without steam-stripping, particularly when the solvent is a substance which is chemically indifferent to the oil at elevated temperatures and thus permits the use of the latter without causing decomposition of the oil or the formation of undesirable reaction products.

The amount of the solvent component that is necessary for completely stripping the oil solution of the other solvent component or components is dependent on the amount of the latter present in the oil. Since the raffinate and extract solutions resulting from the extraction contain relatively large amounts of the solvent mixture, particularly in the case of the extract-solution, we prefer to remove the bulk of the solvent to be stripped by a simple evaporation method prior to the stripping step, in order to reduce the amount of stripping agent required. Moreover, such a preliminary evaporation makes it possible to secure from the oil solution the amount of stripping agent needed for the stripping step, both when the highest or when the lowest boiling solvent component is utilized as previously described.

An object of our invention, therefore, is to provide a method whereby the solvent stripping agent is obtained in sufficient quantity from the solvent mixture utilized in extracting the oil, thus making unnecessary the introduction of an additional amount into the cycle.

In the case of the raffinate-solution the preliminary evaporation may be effected in a single flash-step, the solution being heated and then introduced into an evaporation chamber.

However, in the case of the extract-solution, which contains the bulk of the solvent mixture utilized, it is advantageous to use two, or even three, flash-steps prior to the stripping step.

A feature of our invention resides in the use of two such evaporation stages arranged in series and held under the same elevated pressure, the overhead from the second being used for heating the first, and the second being heated by steam or other external source of heat. In the first evaporator the bulk of the low-boiling solvent component will go overhead at a moderate temperature; and the extract-solution which leaves this first stage can then be heated by steam so as to cause the bulk of the higher-boiling solvent component or components to go overhead in the second stage. Since these higher boiling solvent components can be condensed at a relatively high temperature, their latent heat can be used with advantage for heating in the first stage, and at the same time they will be condensed and thus reduce the amount of solvent vapor to be condensed with cooling water.

By dephlegmating the solvent vapors going overhead in one of the above-mentioned flash-steps, a purified solvent gas can be readily obtained for use as the stripping agent.

The hydrocarbon oils to be extracted in a solvent treating plant usually carry a certain amount of water which acccumulates in the solvent cycle and will cause corrosion of the equipment if a certain water concentration in the circulating solvent is surpassed. In order to keep the water concentration of the circulating solvent below the danger point, provision must be made for continuously removing a certain amount of water from the solvent cycle.

According to our invention the overhead vapor, or part of the overhead vapor, from that extract flash-step in which a maximum amount of water is vaporized, is introduced into a fractionation column. The fractionation column is operated in such a way that from a certain point pure water, or at least a liquid solvent-water mixture of high water concentration, can be withdrawn. In the latter case, this liquid solvent-water mixture may be further separated by another fractionating step, or simply by settling in case the solvent is insoluble or only slightly soluble in water.

In the accompanying drawings, wherein we have illustrated our invention, and in which like numerals designate like parts;

Fig. 1 is a flow sheet showing the method of mixed solvent recovery described below in Example 1; and Fig. 2 is a flow sheet showing the alternative method described in Example 2.

*Example 1*

This example illustrates a method of recovering and reusing a solvent mixture consisting of liquid-$SO_2$ and benzol employed for treating a petroleum lubricating oil fraction. In the solvent stripping step, $SO_2$ gas is used as the stripping agent, thus illustrating the employment of the lower boiling component of solvent mixtures for this purpose.

The oil to be solvent-treated is pumped into the plant by liquid transfer pump 1 and forced into the lower part of mixing tower 2 where it rises upwards. In counter-current relation to the oil, the liquid-$SO_2$-benzol solvent mixture which is introduced into the upper part of the mixing tower flows downwards through the tower. This solvent mixture comes from the solvent recovery system and is pumped into the mixer by pump 3. On the way to the mixer the solvent mixture passes either through cooler 4 or through heater 5, depending upon the treating temperature desired.

From the top of mixer 2 the raffinate-solution, that is, the refined oil containing a certain amount of the solvent mixture, flows continuously through a heat exchanger 6 and heater 7 into raffinate condenser-pressure evaporator 8. In this evaporator the major part of the solvent mixture dissolved in the raffinate is evaporated under the pressure of the water cooled condenser 9 in which the solvent vapors are liquefied. From the evaporator 8 the raffinate solution flows through heater 11 into the stripper 12. In this stripper, which is held at about atmospheric pressure, the raffinate solution flows over rectifying plates or through layers of filling material downwards, while $SO_2$ gas introduced at the bottom of the column passes upwards through the tower, thus stripping the benzol out of the oil. The traces of $SO_2$ remaining in the benzol-free raffinate leaving the bottom of the stripper are removed in vacuum evaporator 13 with heater 14, through which the raffinate flows next. The solvent-free raffinate is continuously discharged from vacuum evaporator 13 by means of pump 15 and sent through heat exchanger 6 into storage tanks not show in the drawings. In heat exchanger 6 the hot raffinate is cooled in heat interchange with the incoming raffinate solution which is thus preheated.

The benzol-sulphur dioxide vapors from the stripper 12 are passed through a cooler 30 in which part of these vapors is condensed out under about atmospheric pressure. The condensate is separated from the remaining vapors in trap 31, and from there it is discharged into collector 10 by means of pump 32. The remaining vapors are passed over to compressor 33 in which they are compressed to a pressure sufficiently high so that they can be liquefied in the water cooled condenser 9.

The vapors from the vacuum evaporator 13 are first compressed to about atmospheric-pressure by compressor 34 and then further compressed to condenser-pressure by means of the above mentioned compressor 33.

From the base of mixer 2 the extract-solution, that is the bulk of the solvent mixture employed for extraction carrying in solution the undesirable constituents removed from the oil, flows continuously through the heat exchanger 16 and through heater 17 into evaporator 18. In heater 17 the extract-solution is heated by part of the vapors taken overhead in the evaporator 19, and these vapors are thereby condensed. Evaporator 18 is held at a moderate temperature so that mainly the lower boiling $SO_2$ is removed from the extract-solution. Any benzol expelled from the extract-solution with the $SO_2$ is held back by means of liquid-$SO_2$ introduced as a reflux into the top of tower 18. This reflux is supplied from the liquid-$SO_2$ collector 27.

From the evaporator 18 the extract-solution flows continuously through steam heater 20 into evaporator 19 in which, due to the increased temperature, the benzol is largely removed from the extract-solution. The two evaporators 18 and 19 are operated at about the same pressure, and this pressure is slightly higher than that prevailing in the water cooled sulphur dioxide condenser 26 in which the major part of the overhead from evaporator 18 is condensed. The rest of this pure sulphur dioxide-overhead is used for stripping in the strippers 12 and 22. The overhead from evaporator 19 is partly used for heating the incoming extract solution in heater 17 as mentioned above, and the rest is further processed in fractionating column 28 as described below.

From evaporator 19 the extract solution flows continuously through heater 21 into stripper 22 and from there through heater 24 into the vacuum evaporator 23. In these two stages the benzol and sulphur dioxide, respectively, are removed in the same way as in stages 12 and 13 in the raffinate recovery system, and are joined with the respective vapors from the latter. The solvent-free extract is continuously withdrawn from vacuum evaporator 23 by means of pump 25, and forced through heat exchanger 16 into storage tanks not shown in this drawing.

In evaporator 19 a large part of the water entering the extract recovery system with the extract solution goes overhead together with the solvent vapors. In order to remove this water from the solvent cycle, part of the overhead from evaporator 19 is passed over into fractionating column 28 in which by means of sulphur dioxide-reflux the benzol and the water are held back so that an essentially pure sulphur dioxide-overhead leaves the top of the tower. There is a reboiler 35 provided in the base of the tower by means of which the bottoms, consisting of benzol plus water, are heated up to a temperature sufficiently high so that the sulphur dioxide is removed from the benzol-water mixture. The mixture of benzol and water flows from the base of the fractionator into separator 29 where the water is settled out and removed, while the benzol is passed over to collector 10.

In condenser 9 all mixed solvent vapors from the recovery system are liquefied and the condensate flows into collector 10 from which it is picked up and forced into mixer 2 by pump 3.

The sulphur dioxide condenser 26 serves for the liquefaction of the sulphur dioxide required for reflux in evaporator 18 and in rectifier 28. The sulphur dioxide liquefied in this condenser is collected in collector 27 and from there it is charged to the top of the towers 18 and 28.

*Example 2*

This example illustrates an alternative benzol-$SO_2$ solvent recovery method and shows the use of benzol vapors as the stripping agent.

The extraction system is the same as that shown in Fig. 1 and described in Example 1. Referring to Fig. 2:

The raffinate-solution coming from the top of the mixer flows through heat exchanger 6' and through steam heater 7' into evaporator 8' in which a large part of the mixed solvent is evaporated under condenser pressure. From evaporator 8' the remaining raffinate-solution is passed over to the tower stripper 40 which is operated at about atmospheric pressure and is equipped with stripping plates or with filling material. A steam-heated reboiler 41 is provided at the base of tower 40, as part of the stripping system. In this reboiler the raffinate-solution after having passed down through the tower is heated up to such a temperature that the major part of the benzol and all the sulphur dioxide is evaporated. The benzol vapors ascending in the tower and coming into intimate contact with the downward flowing raffinate solution exerts a blowing effect on the raffinate and facilitates the complete removal of the sulphur dioxide. The bottoms leaving this stripping system and containing a certain amount of benzol, are continuously discharged into stripper 42 in which the benzol is stripped out of the oil by means of steam. Pump 43 picks the solvent-free raffinate up from the base of stripper 42 and forces it through heat exchanger 6' into storage tanks not shown in the drawings. In heat exchanger 6' the hot raffinate is cooled down by heat interchange with the cold incoming raffinate-solution. There is sufficient pressure difference maintained between the strippers 40 and 42 so that there is no pump necessary for transferring the liquid from the former into the latter.

The overhead from the atmospheric stripper 40 passes a water-cooled cooler 30' in which the major part of the benzol is condensed out from the vapors. The condensate is collected in trap 31', and from there it is passed over into the collector 10' by means of pump 32'. The non-condensed vapors are picked up by compressor 33', are compressed to the pressure of the water cooled condenser 9' and discharged into the latter.

The overhead from stripper 42, consisting of benzol and water vapor, is passed through the watercooled cooler 60 in which the total vapors are liquefied. In the separator 61 the water is settled out from the benzol and removed from the solvent cycle, while the benzol is passed over into trap 31' where it is combined with the condensate from cooler 30', and from where it is recycled into the solvent collector 10' by pump 32'.

The extract-solution coming from the base of the mixer flows through heat exchanger 16' and through heater 17' into evaporator 46. In heat exchanger 16' the cold extract-solution is preheated by heat interchange with the hot solvent-free extract, while in heater 17' further heating of the extract solution is done by means of solvent vapors coming from evaporator 19' and being condensed in this heater. The temperature maintained in evaporator 46 is relatively low so that chiefly the lower boiling sulphur dioxide is taken overhead in this evaporator. This overhead is combined with the solvent vapors coming from raffinate evaporator 8', and the total mixed solvent vapors are passed over to the water cooled condenser 9' where they are liquefied. The condensate flows into solvent collector 10' and from there back into the mixer as shown in Fig. 1.

The extract solution leaving the base of evaporator 46 flows continuously through steam heater 20' into evaporator 19'. Due to the increase in temperature a large amount of the benzol originally present in the extract solution is removed in this evaporator together with sulphur dioxide. Part of the overhead from the evaporator is used for preheating the incoming extract solution in heater 17' as described above, while the remainder of the vapors leaving this evaporator is passed over into the fractionator 28' for further processing as described below. The solvent condensate from heater 17' flows into the mixed solvent collector 10'.

From evaporator 19' the extract-solution flows to stripping tower 49, provided with reboiler 50, and from there to stripper 51. These two stages are operated in the same way as strippers 40 and 42, respectively, on the raffinate side. Pump 25' discharges the solvent-free extract from stripper 51 and pumps it through the above mentioned heat exchanger 16' into storage tanks not shown in the drawings. The overheads from strippers 49 and 51 are respectively combined with those from strippers 40 and 42, and the succeeding steps with respect thereto are as described above in connection with the latter.

The removal of the water from the stream of extract solution is in this plant done in the following way. The solvent vapors going overhead in evaporator 19' will carry a relatively large amount of water since here the bulk of the benzol is evaporated, the boiling point of which is nearer to that of the water than that of the sulphur dioxide. As in Example 1, part of this overhead is passed over into the tower fractionator 28'. In this case the water and the benzol are held back by means of the dephlegmator cooler 54 provided on top of the fractionator, so as to secure a dry SO₂ overhead. In the base of fractionator tower 28' the mixture of benzol, sulphur dioxide and water is reboiled whereby the sulphur dioxide is removed from the mixture. In separator 29' the water is settled out from the benzol and removed from the cycle, while the benzol is transferred to the reboiler 50 in order to increase the stripping effect for the removal of the sulphur dioxide in tower 49.

In the claims it will be understood that the term "oil fraction" embraces both raffinates and extracts, since these are obtained by solvent fractionation. The term "solvent aid" includes one or more components. The term "condenser-pressure for SO₂" means a pressure such that SO₂ vapor evolved under this pressure can be passed to a water-cooled condenser and there liquefied without pumping or other means for increasing its pressure being required.

It is obvious that the process may be applied to the recovery of solvents used for deasphaltizing, dewaxing, and other modes of treatment of lubricating oil fractions utilizing mixed solvents.

Having disclosed several embodiments of the invention for purposes of illustration, but without any intent to be limited thereby either as to the particular steps or combinations of steps described, what we claim is as follows:

1. In a process of treating a mineral lubricating oil with a plurality of lower-boiling solvents, the method of recovering a mixture of solvents contained in an oil fraction, after said treatment, which comprises removing the bulk of the solvent mixture by simple evaporation, subsequently stripping the oil fraction with the vapor of a solvent which has been utilized in the treatment and later separated out, at a pressure and temperature to remove the other remaining solvent material, removing the residual solvent to complete the removal of the treatment solvents, and collecting the removed solvents in condition for reuse.

2. In a process of treating a mineral lubricating oil with a plurality of lower-boiling solvents, the method of recovering a mixture of solvents contained in an oil fraction, after said treatment, which comprises removing the bulk of the solvent mixture by simple evaporation, subsequently stripping the oil fraction with the vapor of a solvent which has been utilized in the treatment and later separated out, at a pressure and temperature to remove the other remaining solvent material, removing the residual solvent to complete the removal of the treatment solvents by subsequently stripping the oil fraction with a gaseous agent readily removable therefrom and from the evolved solvent, and collecting the removed solvents in condition for reuse.

3. In a process of treating a mineral lubricating oil with a plurality of lower-boiling solvents, the method of recovering a mixture of solvents contained in an oil fraction, after said treatment, which comprises removing the bulk of the solvent mixture by simple evaportion, subsequently stripping the oil fraction with the vapor of a solvent which has been utilized in the treatment and later separated out, at a pressure and temperature to remove the other remaining solvent material, removing the residual solvent to complete the removal of the treatment solvents by subsequently subjecting the oil fraction to evaporation at a suitable temperature and pressure, and collecting the removed solvents in condition for reuse.

4. In a process of treating a mineral lubricating oil with a lower-boiling selective mixed-solvent containing liquid-SO₂, the method of recovering the mixture of solvents contained in an oil fraction, after said treatment, which comprises removing the bulk of the solvent mixture by simple evaporation, subsequently stripping the oil fraction with the vapor of a solvent which has been utilized in the treatment and later separated out, at a pressure and temperature to remove the other remaining solvent material, removing the residual solvent to complete the removal of the treatment solvents, and collecting the removed solvents in condition for reuse.

5. In a process of treating a mineral lubricating oil with a selective solvent mixture of liquid-SO₂ and benzol, the method of recovering the liquid-SO₂ and benzol contained in an oil fraction, after said treatment, which comprises removing the bulk of the solvent mixture by simple evaporation, subsequently stripping the oil fraction with the vapor of one of the named solvents which has been utilized in the treatment and later separated out, at a pressure and temperature to substantially remove the other solvent, removing the residual solvent by vaporization to complete the removal of the treatment solvents, and collecting the removed solvents in condition for reuse.

6. In a process of treating a mineral lubricating oil with a selective solvent mixture of liquid-SO₂ and benzol, the method of recovering the liquid-SO₂ and benzol contained in an oil fraction, after said treatment, which comprises removing the bulk of the liquid-SO₂ and benzol by simple evaporation, subsequently stripping the oil fraction with the vapor of SO₂ which has been utilized in the treatment and later separated out, at a pressure and temperature to remove the remaining benzol, removing the residual SO₂ by vaporization, and collecting and condensing the removed SO₂ and benzol vapors in condition for reuse.

7. In a process of treating a mineral lubricating oil with a selective solvent mixture of liquid-SO₂ and benzol, the method of recovering the liquid-SO₂ and benzol contained in an oil fraction, after said treatment, which comprises removing the bulk of the liquid-SO₂ and benzol by simple evaporation, subsequently stripping the oil fraction with the vapor of SO₂ which has been utilized in the treatment and later separated out, at a pressure and temperature to remove the remaining benzol, removing the residual SO₂ by subjecting the oil fraction to evaporation under vacuum, and collecting and condensing the removed SO₂ and benzol vapors in condition for reuse.

8. In a process of treating a mineral lubricating oil with a selective solvent mixture of liquid-SO₂ and benzol, the method of recovering the liquid-SO₂ and benzol contained in an oil fraction, after said treatment, which comprises removing the bulk of the liquid-SO₂ and benzol by simple evaporation, subsequently stripping the oil fraction with the vapor of benzol which has been utilized in the treatment and later separated out, at a pressure and temperature to remove the remaining SO₂, removing the residual benzol by vaporization, and collecting and condensing the removed SO₂ and benzol vapors in condition for reuse.

9. In a process of treating a mineral lubricating oil with a selective solvent mixture of liquid-SO₂ and benzol, the method of recovering the liquid-SO₂ and benzol contained in an oil fraction, after said treatment, which comprises removing the bulk of the liquid-SO₂ and benzol by simple evaporation, subsequently stripping the oil fraction with the vapor of benzol which has been utilized in the treatment and later separated out, at a pressure and temperature to remove the remaining SO₂, removing the residual benzol by stripping with steam and removing the steam from the evolved benzol, and collecting and condensing the removed SO₂ and benzol vapors in condition for reuse.

10. A method of recovering from a mineral lubricating oil fraction a lower-boiling solvent mixture contained therein following solvent treatment of the oil, the solvent mixture including several components of substantially different boiling points, which comprises vaporizing the bulk of the lowest boiling solvent component by heating the oil fraction at least partially with higher boiling vapors derived in a subsequent step, subsequently heating the oil to a higher temperature to vaporize the bulk of the remaining solvent and provide said higher boiling vapors, stripping the oil fraction, completing the removal of the solvent mixture, and collecting the removed solvents in condition for reuse.

11. A method of recovering from a mineral lubricating oil fraction a selective solvent mixture of liquid-SO₂ and a substantially higher-boiling solvent aid of lower boiling point than the oil contained therein following solvent treatment of the oil, which comprises vaporizing the bulk of the liquid-SO₂ by heating the oil fraction at least partially with higher boiling vapors of the solvent aid derived in a subsequent step, subsequently heating the oil to a higher temperature to vaporize the bulk of the remaining solvent aid and provide said higher boiling vapors, stripping the oil fraction with a constituent of said solvent mixture, completing the removal of the solvent mixture from the oil fraction, and collecting the removed solvents in condition for reuse.

12. A method of recovering from a mineral lubricating oil extract-solution a solvent mixture of liquid-SO₂ and benzol contained therein, which comprises subjecting the extract-solution to evaporation in two stages under condenser-pressure for SO₂, heating the extract-solution in the first stage with benzol vapors derived from the second stage so as to vaporize the bulk of the liquid-SO₂, heating the extract-solution from the first stage at a higher temperature in the second stage to vaporize the bulk of the benzol, thereafter stripping the extract-solution with one component of the solvent mixture to remove the balance of the other, completing the removal of the solvent mixture, and collecting the removed solvent mixture in condition for reuse.

13. A method of recovering from a moisture-containing mineral lubricating oil extract-solution a solvent mixture of liquid-SO₂ and benzol contained therein, which comprises subjecting the extract-solution to evaporation in two stages under condenser-pressure for SO₂, heating the extract-solution in the first stage with benzol vapors derived from the second stage so as to vaporize the bulk of the liquid-SO₂, heating the extract-solution from the first stage at a higher temperature in the second stage to vaporize the bulk of the benzol, removing water by subjecting at least a portion of the solvent vapors from the second stage to dephlegmation and fractionation, stripping the extract-solution and completing the removal of the solvent mixture, and collecting the removed solvent mixture in condition for reuse.

14. A method of recovering from a mineral lubricating oil extract-solution a solvent mixture of liquid-SO₂ and benzol contained therein, which comprises subjecting the extract-solution to evaporation in two stages under condenser-pressure for SO₂, heating the extract-solution in the first stage with benzol vapors derived from the second stage so as to vaporize the bulk of the liquid-SO₂, heating the extract-solution from the first stage at a higher temperature in the second stage to vaporize the bulk of the benzol, purifying a portion of the benzol vaporized in the second stage and stripping the extract-solution from the second stage therewith, completing the removal of the solvent mixture, and collecting the removed solvent mixture in condition for reuse.

15. A method of recovering from a mineral lubricating oil extract-solution a solvent mixture of liquid-SO₂ and benzol contained therein, which comprises subjecting the extract-solution to evaporation in two stages under condenser-pressure for SO₂, heating the extract-solution in the first stage with benzol vapors derived from the second stage so as to vaporize the bulk of the liquid-SO₂, heating the extract-solution from the first stage at a higher temperature in the second stage to vaporize the bulk of the benzol, dephlegmating the SO₂ vaporized in the first stage and stripping the extract-solution from the second stage therewith, completing the removal of the solvent mixture, and collecting he removed solvent mixture in condition for reuse.

16. In a process of solvent-refining lubricating oil stock with liquid-$SO_2$ and benzol, the method of recovering the liquid-$SO_2$ and benzol contained in the extract-solution which comprises subjecting the extract-solution to evaporation in two stages under condenser-pressure for $SO_2$, heating the extract-solution in the first stage with benzol vapors derived from the second stage so as to vaporize the bulk of the liquid-$SO_2$ and condense said benzol vapors, heating the extract-solution from the first stage at a higher temperature in the second stage to vaporize benzol for use in the first stage as above-specified; dephlegmating the vapors derived from said first stage, and any vapors derived from said second stage not employed for heating the first stage, to secure benzol-free $SO_2$ vapor; stripping at atmospheric pressure the extract-solution from said second stage with said benzol-free $SO_2$ vapor to free the same of benzol; subjecting the stripped extract-solution to evaporation under vacuum to remove the $SO_2$ contained therein, thereby securing solvent-free extract; and condensing and collecting the evolved $SO_2$ and benzol vapors for reuse in refining oil stock.

17. In a process of solvent-refining lubricating oil stock with liquid-$SO_2$ and benzol, resulting in a raffinate-solution and an extract-solution, including the securing of benzol-free $SO_2$ vapor from the extract-solution, the steps of recovering the liquid-$SO_2$ and benzol contained in the raffinate-solution which comprise heating the raffinate-solution under condenser-pressure for $SO_2$ to evaporate the bulk of the liquid-$SO_2$ and benzol contained therein, stripping the raffinate-solution at atmospheric pressure with said benzol-free $SO_2$ vapor from the extract-solution to remove the remaining benzol contained therein, subjecting the stripped raffinate-solution to evaporation under vacuum to remove the $SO_2$ contained therein, thereby securing solvent-free raffinate, and condensing and collecting the evolved $SO_2$ and benzol vapors for reuse in refining oil stock.

18. The method of refining mineral oil which comprises extracting it with a mixture of high boiling and low boiling solvents, separating the oil contaminated by solvents from the solvent containing the extract, and separately recovering solvents from each fraction by vaporizing most of the high boiling solvent from the oil and stripping the remainder of the high boiling solvent therefrom by introducing vaporized low boiling solvent at a low point to contact directly with the high boiling solvent and oil.

19. In a system of the type described, means for extracting oil with a mixture of a high boiling and a low boiling solvent, means for heating the extracted oil contaminated with said solvents to a temperature at which substantially all of said solvents are vaporized, means for rectifying the vapors to effectively fractionate the low boiling and high boiling solvents and to separate the high boiling solvent from the oil, and means for introducing vaporized low boiling solvent in the oil solvent separating means withdrawn from another point in the system at a low point in the oil solvent separating means to contact directly with the high boiling solvent and oil for removing the last traces of high boiling solvent from the oil.

20. A method of refining petroleum oil which comprises separating naphthenic from paraffinic constituents of the oil with a solvent mixture in which the solvents have a boiling point lower than that of the oil and at least one solvent has a boiling point lower than any other solvent, separately heating the naphthenic and paraffinic fractions to temperatures sufficient to vaporize most of the solvent mixture contained therein, vaporizing the mixed solvents from the heated oil, rectifying the vapors to remove oil from the solvents, and introducing a portion of the lower boiling solvent into the non-vaporized oil at a temperature sufficient to produce the complete vaporization of said lower boiling solvent whereby it serves as a stripping gas to remove the last traces of solvent from the oil.

21. An oil refining process which comprises separating paraffinic from naphthenic constituents of a petroleum oil by extracting said oil with a mixture of a high boiling and a low boiling solvent, both of said solvents and the solvent mixture having a boiling point below that of the oil, separately heating the paraffinic and naphthenic fractions to a temperature sufficient to cause vaporization of both solvents, separating the vaporized solvents from unvaporized oil contaminated with solvents, rectifying the vaporized solvents to remove oil therefrom, introducing condensed low boiling solvent for use as a reflux liquid in said rectifying step, and introducing a portion of said low boiling solvent into said unvaporized oil at a temperature high enough to cause complete vaporization of said low boiling solvent whereby it serves as a stripping means for removing the remaining high boiling solvent from the unvaporized oil.

22. The method of refining mineral oil which comprises extracting it with a solvent mixture for separating paraffinic from naphthenic fractions, said solvent mixture comprising a high boiling and a low boiling solvent, separating the paraffinic oil fraction from the naphthenic oil fraction, each of which being contaminated with solvents, vaporizing most of the solvents from each fraction and stripping the remaining high boiling solvent from the oil by introducing vaporized low boiling solvent at a low point to contact directly with the high boiling solvent and oil whereby the high boiling solvent is stripped from the oil with low boiling solvent so that the system is not contaminated with extraneous stripping gases.

23. The method of claim 20 wherein the low boiling solvent is superheated prior to its use as a stripping agent.

24. The method of claim 21 wherein the low boiling solvent is superheated prior to its use as a stripping agent.

25. In apparatus for refining of petroleum oils by use of a mixture of solvents comprising a high boiling solvent and a low boiling solvent, which includes mixing and settling equipment for commingling the oil with the solvent mixture and obtaining a separation thereof into raffinate and extract portions, means for separately treating said portions comprising an evaporator for driving off the low boiling solvent by moderate heating, a gas and liquid separator having a vapor outlet at its top for separating the high boiling solvent from the oil, said separator having an inlet near its bottom for admitting vaporized low boiling solvent for stripping out the high boiling solvent in vapor form, means for circulating the vaporized solvents including a compressor and pumps for maintaining pressure on said solvent circulating system, and a condenser for liquifying the vaporized solvent after separation from the oil.

26. In a process for the recovery of a mixed solvent of sulphur dioxide and benzene from solution in a hydrocarbon oil the steps comprising heating the hydrocarbon oil containing sulphur dioxide and benzene in solution, stripping said heated oil in countercurrent contact with heated sulphur dioxide vapors and producing thereby overhead vapors of sulphur dioxide and benzene and a bottom hydrocarbon oil substantially free from benzene.

ERNST KOENEMANN.
HANS RAMSER.